United States Patent
Nakamura et al.

(10) Patent No.: US 7,301,703 B2
(45) Date of Patent: *Nov. 27, 2007

(54) TUNABLE FILTER AND METHOD OF MANUFACTURING THE SAME, AND SENSING DEVICE

(75) Inventors: Ryosuke Nakamura, Nagano (JP); Akihiro Murata, Yamanashi (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/143,553

(22) Filed: Jun. 2, 2005

(65) Prior Publication Data

US 2006/0008200 A1   Jan. 12, 2006

(30) Foreign Application Priority Data

Jul. 9, 2004 (JP) ............................. 2004-202739

(51) Int. Cl.
*G02B 27/00* (2006.01)
*G02B 6/26* (2006.01)

(52) U.S. Cl. .................. 359/578; 359/585; 359/589; 385/18; 385/19

(58) Field of Classification Search ............... 359/578, 359/581, 585, 589; 385/14, 18–19, 25, 31, 385/15; 250/338.4; 356/505, 506; 372/99
See application file for complete search history.

(56) References Cited

U.S. PATENT DOCUMENTS

| | | | | |
|---|---|---|---|---|
| 5,561,523 A * | 10/1996 | Blomberg et al. | ........... | 356/454 |
| 5,572,543 A | 11/1996 | Heinemann et al. | | |
| 5,619,046 A | 4/1997 | Engstrom | | |
| 6,400,738 B1 | 6/2002 | Tucker et al. | | |
| 6,590,710 B2 * | 7/2003 | Hara et al. | .................. | 359/579 |
| 6,791,741 B2 | 9/2004 | Hishioka | | |
| 7,012,752 B2 * | 3/2006 | Choi et al. | .................. | 359/578 |
| 2004/0161193 A1 * | 8/2004 | Yee | .............. | 385/31 |
| 2005/0007933 A1 * | 1/2005 | Yoda | ..................... | 369/112.22 |
| 2005/0017177 A1 * | 1/2005 | Tai et al. | ................. | 250/338.4 |
| 2006/0118721 A1 * | 6/2006 | Antoszewski et al. | ... | 250/338.4 |

FOREIGN PATENT DOCUMENTS

JP            07-243963           9/1995

(Continued)

*Primary Examiner*—Hemang Sanghavi
(74) *Attorney, Agent, or Firm*—Harness, Dickey & Pierce, P.L.C.

(57) ABSTRACT

A tunable filter including; a fixed substrate provided with a fixed reflecting film and capable of transmitting light having a shorter wavelength than infrared light; a movable substrate provided with a movable section equipped with a movable reflecting film and disposed to the fixed substrate so that the movable reflecting film and the fixed reflecting film faces each other with a predetermined length of gap; and a drive section for varying the length of the gap by displacing the movable section with respect to the fixed substrate, wherein light entering the gap from the outside is repeatedly reflected by the movable reflecting film and the fixed reflecting film for outputting light having a wavelength corresponding to the length of the gap, and the movable section is provided, at an area to which the movable reflecting film is disposed, with a light transmitting section capable of transmitting light having a shorter wavelength than infrared light and for inputting/outputting light from/to the outside.

2 Claims, 11 Drawing Sheets

FOREIGN PATENT DOCUMENTS

| | | |
|---|---|---|
| JP | 08-500468 | 1/1996 |
| JP | 11-248934 | 9/1999 |
| JP | 2000-214397 | 8/2000 |
| JP | 2001-311883 | 11/2001 |
| JP | 2002-148528 | 5/2002 |
| JP | 2002-174721 | 6/2002 |
| JP | 2002-243937 | 8/2002 |
| JP | 2002-258175 | 9/2002 |
| JP | 2003-29150 | 1/2003 |
| JP | 2003-215473 | 7/2003 |
| KR | 1995-7002024 | 5/1995 |
| KR | 2003-0052549 | 6/2003 |

* cited by examiner

F I G. 1
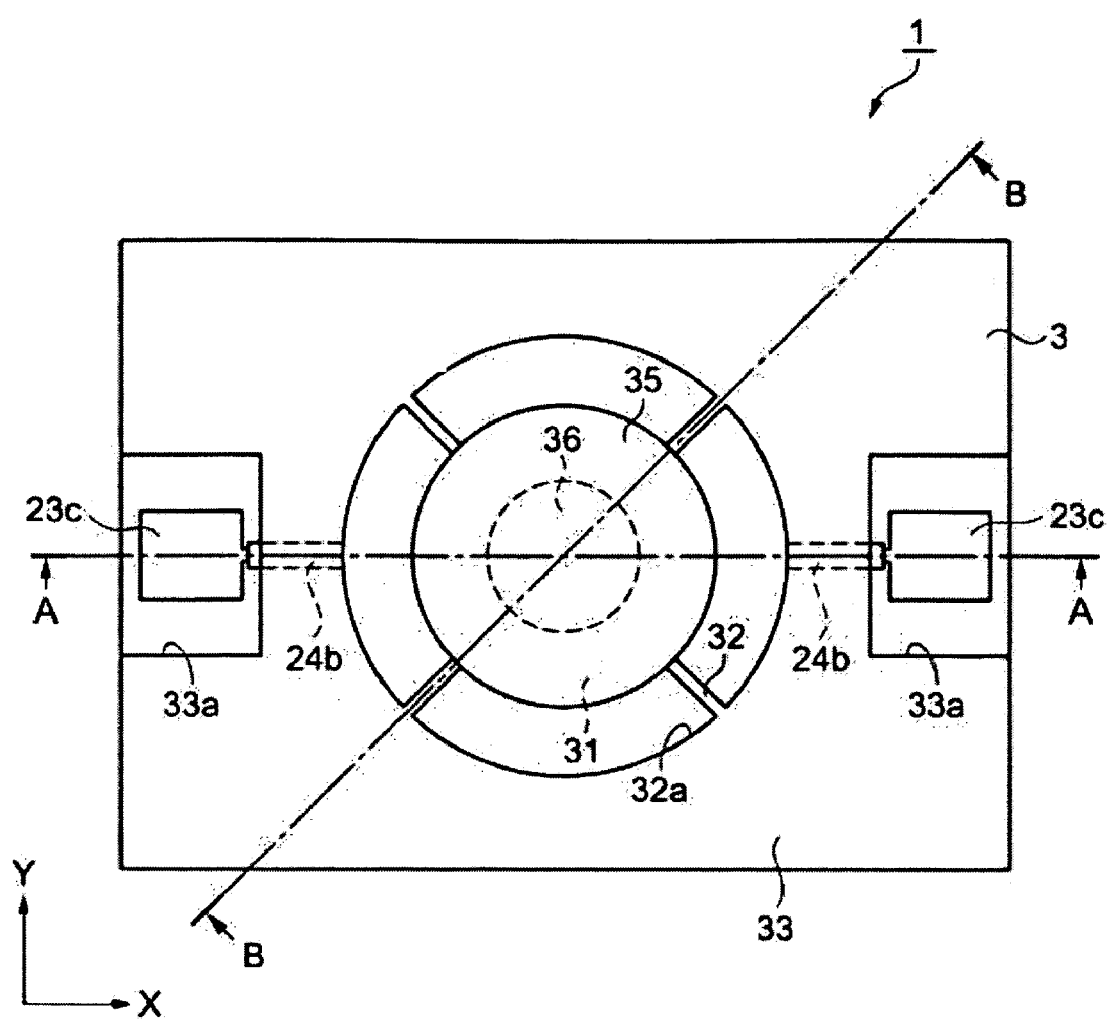

F I G. 7A
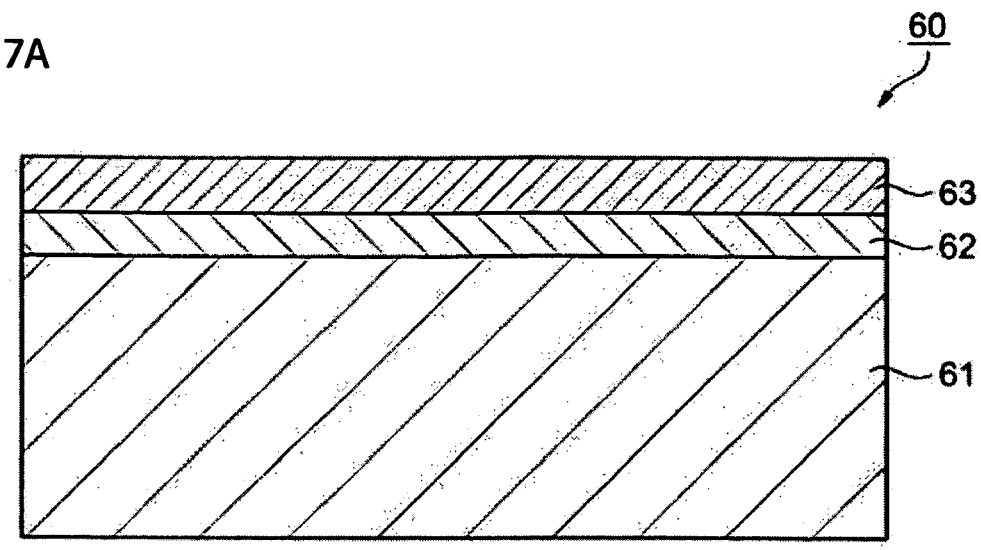
F I G. 7B
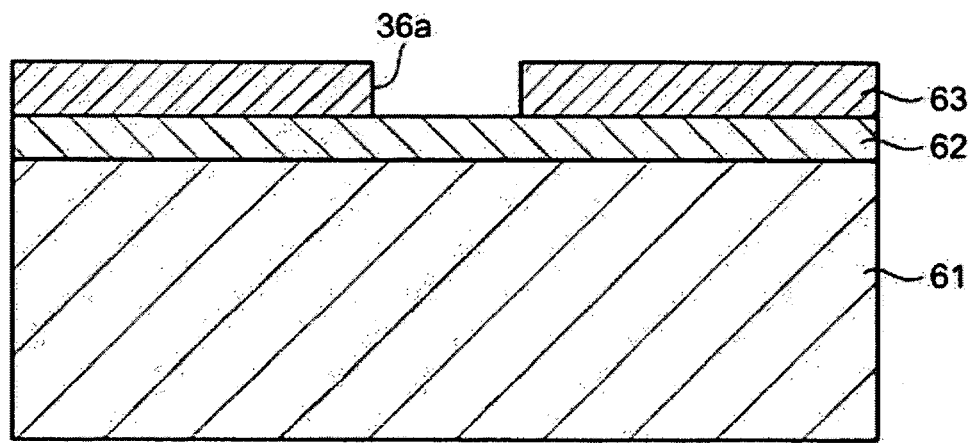

F I G. 1 2
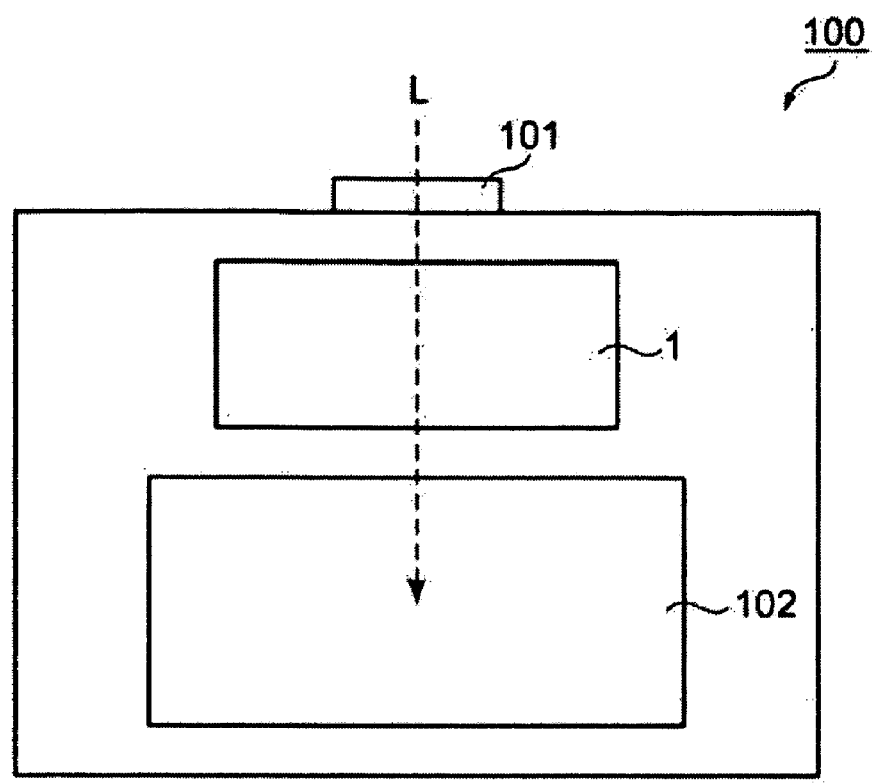

TUNABLE FILTER AND METHOD OF MANUFACTURING THE SAME, AND SENSING DEVICE

RELATED APPLICATIONS

This application claims priority to Japanese Patent Application No. 2004-202739 filed Jul. 9, 2004 which is hereby expressly incorporated by reference herein in its entirety.

BACKGROUND OF THE INVENTION

1. Technical Field

The present invention relates to a tunable filter capable of separating wavelengths of light and method of manufacturing the tunable filter, and a sensing device.

2. Related Art

When light is multiple-reflected between a pair of mirrors (reflecting films) facing each other with a predetermined length of the gap, only light with a specific wavelength corresponding to the length of the gap is transmitted (wavelength-separated). Tunable filters are capable of selecting a wavelength band of the light to be transmitted by tuning the length of the gap. Various kinds of filters having structures, realized by micro-machining, for varying the length of the gap using electrostatic force (coulomb force) generated in accordance with a voltage applied between the pair of mirrors have been proposed.

Japanese Unexamined Patent Publication No. 2002-174721 and The U.S. Pat. No. 6,341,039 disclose examples of the filters having the structures described above.

The filter disclosed in Japanese Unexamined Patent Publication No. 2002-174721 is a filter formed by using the surface micro-machining technology, in which the gap is formed by removing a sacrifice layer by etching, the sacrifice layer being formed on a fixed mirror and a fixed electrode both formed on a substrate, and then being covered with a movable mirror and a movable electrode. Therefore, the length of the gap is determined by the thickness of the sacrifice layer, which causes a problem that the length of the gap is easy to be varied in accordance with the forming conditions of the sacrifice layer. If the length of the gap is varied, the coulomb force generated in accordance with a predetermined applied voltage is varied, thus it becomes difficult to arrange the length of the gap to be a desired value.

Incidentally, in the filter disclosed in The U.S. Pat. No. 6,341,039, the gap can be formed with precision because the gap is formed using a silicon dioxide ($SiO_2$) layer, which is an embedded oxide film of a SOI (Silicon On Insulator) substrate, as the sacrifice layer. However, since the movable mirror is not insulated from the drive electrode equipped with the fixed mirror, a phenomenon called sticking may occur, in which the movable mirror is adhered to the drive electrode by the coulomb force.

Further, in either case of the examples, an opening (release hole) for introducing the etching fluid to remove the sacrifice layer is formed in, for example, the movable mirror formed on the upper surface of the sacrifice layer. Therefore, since the area of the electrode on the movable mirror is reduced as much as the area of the release hole, the drive voltage needs to be set higher in order for generating predetermined coulomb force, thus increasing the power consumption. Further, if the required length of the gap is small, the sticking caused by surface tension of water may occur in a cleaning process after removing the sacrifice layer. Therefore, a tunable filter having a structure that can be formed without removing the sacrifice layer is expected.

Further, the filters disclosed in the above patent documents have problem that the light to be separated is limited to infrared light because silicon is provided to the light transmitting paths.

SUMMARY

An advantage of the invention is to provide a tunable filter that can be formed without removing the sacrifice layer and can separate light having a shorter wavelength than infrared light and a method of manufacturing the tunable filter, and a sensing device.

A tunable filter according to an aspect of the invention includes a fixed substrate provided with a fixed reflecting film and capable of transmitting light having a shorter wavelength than infrared light, a movable substrate provided with a movable section equipped with a movable reflecting film and disposed to the fixed substrate so that the movable reflecting film and the fixed reflecting film faces each other with a predetermined length of gap, and a drive section for varying the length of the gap by displacing the movable section with respect to the fixed substrate. Further, light entering the gap from the outside is repeatedly reflected by the movable reflecting film and the fixed reflecting film for outputting light having a wavelength corresponding to the length of the gap, and the movable section is provided, at an area to which the movable reflecting film is disposed, with a light transmitting section capable of transmitting light having a shorter wavelength than infrared light and for inputting/outputting light from/to the outside.

According to this, since the light transmitting section capable of transmitting light having a shorter wavelength than infrared light is provided, the wavelength separation of the light having a shorter wavelength than infrared light becomes possible.

A tunable filter according to another aspect of the invention includes a fixed substrate provided with a first hollow section and a second hollow section formed in one surface thereof, and capable of transmitting light having a shorter wavelength than infrared light, a movable substrate having a electrically conductive property and provided with a movable section and disposed to the fixed substrate so that the movable section faces bottom surfaces of the first and the second hollow sections, a movable reflecting film provided to a surface of the movable section, the surface facing the bottom surfaces of the first and the second hollow sections, a fixed reflecting film provided to the bottom surface of the first hollow section defining a first gap with the movable reflecting film, and a drive electrode provided to the bottom surface of the second hollow section defining a second gap with the movable section and for displacing the movable section with respect to the fixed substrate, by coulomb force generated by a potential difference from the movable section, to vary the length of the first gap. Further, light entering the first gap from the outside is repeatedly reflected by the movable reflecting film and the fixed reflecting film for outputting light having a wavelength corresponding to the length of the first gap, and the movable section is provided, at an area to which the movable reflecting film is disposed, with a light transmitting section capable of transmitting light having a shorter wavelength than infrared light and for inputting/outputting light from/to the outside.

According to this, since the light transmitting section capable of transmitting light having a shorter wavelength than infrared light is provided, the wavelength separation of the light having a shorter wavelength than infrared light becomes possible.

In the tunable filter, an insulating film may preferably be provided to at least one of an area of the movable section facing the drive electrode and an area of the drive electrode facing the movable section.

According to this, since an insulating film is provided to at least one of the area of the moving section facing the drive electrode and the area of the drive electrode facing the moving section, if excessive coulomb force acts on between the movable section and the drive electrode, the movable section and the drive electrode can be prevented from sticking to each other.

In the tunable filter, an antireflection film may preferably be provided to at least one of a surface of the light transmitting section opposite to the surface provided with the movable reflecting film and a surface of the fixed substrate opposite to the surface provided with the fixed reflecting film.

According to this, reflection can be prevented when inputting light, thus the light from the outside can efficiently be taken.

In the tunable filter, the fixed substrate may preferably be made of glass containing mobile ions.

According to this, the fixed substrate and the movable substrate can be bonded with each other by an anodic bonding process. Namely, since bonding can be performed without any other materials such as adhesives, the precision of the first gap is improved to enable to accurately set the wavelength of separation.

In the tunable filter, the light transmitting section may preferably be made of glass capable of transmitting light having a shorter wavelength than infrared light.

According to this, the wavelength-separation of the light having a shorter wavelength than infrared light becomes possible, and in addition, the light transmitting section can easily be formed by a sputtering process.

In the tunable filter, the light transmitting section may preferably be made of silicone rubber capable of transmitting light having a shorter wavelength than infrared light.

According to this, the wavelength-separation of the light having a shorter wavelength than infrared light becomes possible, and in addition, the light transmitting section can easily be formed by a molding process.

In the tunable filter, the movable substrate may preferably be made of silicon.

According to this, the movable substrate can easily be manufactured by a semiconductor manufacturing process.

A method of manufacturing a tunable filter according to still another aspect of the invention includes forming a fixed substrate provided with a fixed reflecting substrate, bonding a base material for forming a movable substrate and provided with a movable reflecting film with the fixed substrate so that the movable reflecting film and the fixed reflecting film face each other with a gap. Further, after the bonding step, the method includes forming the movable substrate provided with a light transmitting section in a movable section thereof on the fixed substrate, the light transmitting section being capable of transmitting light having a shorter wavelength than infrared light.

According to this method, since the base material provided with the movable reflecting film is bonded with the fixed substrate so that the movable reflecting film and the fixed reflecting film face each other with the gap, the process of removing the sacrifice layer to form the gap is not required. Further, since the release hole does not need to be provided in accordance therewith, the coulomb force can effectively be utilized.

Further, since the light transmitting section capable of transmitting light having a shorter wavelength than infrared light is provided, the wavelength separation of the light having a shorter wavelength than infrared light becomes possible.

A method of manufacturing a tunable filter according to still another aspect of the invention includes providing a first and a second hollow sections to a fixed substrate, providing a drive electrode to a bottom surface of the second hollow section, providing a fixed reflecting film to a bottom surface of the first hollow section, and forming, after the fixed reflecting film providing step, the movable substrate provided with a light transmitting section in a movable section thereof on the fixed substrate, the light transmitting section being capable of transmitting light having a shorter wavelength than infrared light.

According to this method, the movable substrate is formed on the fixed substrate after forming the first and the second hollow sections on the fixed substrate and then forming the fixed reflecting film and the drive electrode on the respective bottom surfaces. Therefore, the process of removing the sacrifice layer to form the first and the second gaps is not required. Further, since the release hole does not need to be provided in accordance therewith, the coulomb force can effectively be utilized.

Further, since the fixed substrate and the movable substrate can separately be manufactured, the insulating film for preventing the movable section and the drive electrode from sticking to each other can easily be formed between the movable section and the drive electrode Further, since the light transmitting section capable of transmitting light having a shorter wavelength than infrared light is provided, the wavelength separation of the light having a shorter wavelength than infrared light becomes possible.

In the method of manufacturing a tunable filter, the fixed substrate may preferably be made of glass, and the first hollow section may preferably be formed by an etching process.

According to this method, since the first hollow section is formed by an etching process of the glass offering high precision of formation, the first gap can be formed with good precision. As a result, the wavelength for separation can accurately be set.

In the method of manufacturing a tunable filter, the fixed substrate may preferably be made of glass, and the second hollow section may preferably be formed by an etching process.

According to this method, since the second hollow section is formed by an etching process of the glass offering high precision of formation, the second gap can be formed with good precision. As a result, the coulomb force can be controlled with high accuracy.

In the method of manufacturing a tunable filter, a step of providing an insulating film to at least one of an area of the movable section facing the drive electrode and an area of the drive electrode facing the movable section may preferably be included.

According to this method, since an insulating film is provided to at least one of the area of the moving section facing the drive electrode and the area of the drive electrode facing the moving section, if excessive coulomb force acts on between the movable section and the drive electrode, the movable section and the drive electrode can be prevented from sticking to each other.

In the method of manufacturing a tunable filter, the step of forming the movable substrate on the fixed substrate may preferably include providing a base material including a base layer, an insulating layer formed on the base layer, and an active layer formed on the insulating layer and forming the movable substrate, bonding the base material with the fixed substrate, removing the base layer using the insulating layer as a stopper layer, and removing the insulating layer.

According to this method, since the base layer is removed using the insulating layer as the stopper layer, the active layer can be prevented from being damaged while removing the base layer. As a result, since the thickness precision of the movable substrate, namely the movable section, is improved, the movable section can stably be driven, thus the variable amount of the first gap can accurately be controlled, and further, the manufacturing process yield can be enhanced.

In the method of manufacturing a tunable filter, the step of forming the movable substrate on the fixed substrate may preferably include, providing to the active layer of the base material an opening section for forming the light transmitting section, and sputtering to the opening section the glass capable of transmitting light having a shorter wavelength than infrared light to form the light transmitting section.

According to this method, the wavelength-separation of the light having a shorter wavelength than infrared light becomes possible, and in addition, the light transmitting section can easily be formed by a sputtering process.

In the method of manufacturing a tunable filter, the step of forming the movable substrate on the fixed substrate may preferably include, providing to the active layer of the base material an opening section for forming the light transmitting section, and running to the opening section the silicone rubber capable of transmitting light having a shorter wavelength than infrared light to form the light transmitting section.

According to this method, the wavelength-separation of the light having a shorter wavelength than infrared light becomes possible, and in addition, the light transmitting section can easily be formed by a molding process.

A sensing device according to still another aspect of the invention includes the tunable filter described above.

According to this method, since the tunable filter is equipped with the light transmitting section capable of transmitting light having a shorter wavelength than infrared light, the sensing object for the sensing device is not limited to infrared light.

BRIEF DESCRIPTION OF THE DRAWINGS

The invention will be described with reference to the accompanying drawings, wherein like numbers refer to like elements, and wherein:

FIG. 1 is a plan view showing a tunable filter of a first embodiment.

FIGS. 7A and 7B are cross-sectional views showing a method of manufacturing a tunable filter;

FIG. 12 is a configuration diagram showing a sensing device of a second embodiment.

DESCRIPTION OF THE EMBODIMENTS

Embodiment 1

Figure 2:
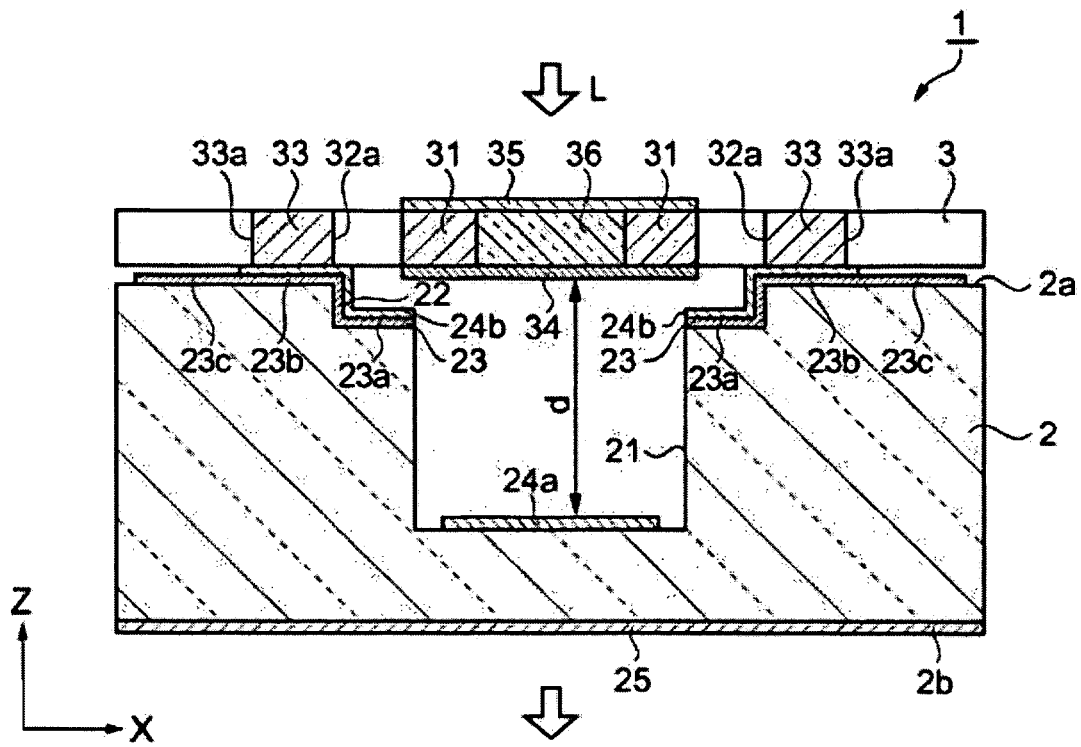
FIG. 2 is a cross-sectional view along the A—A line of FIG. 1.

A tunable filter of a first embodiment according to the invention will now be described with reference to the accompanying drawings. FIG. 1 is a plan view showing the tunable filter of the present embodiment. FIG. 2 is a cross-sectional view thereof along the A—A line, and FIG. 3 is a cross-sectional view thereof along the B—B line.

Figure 3:
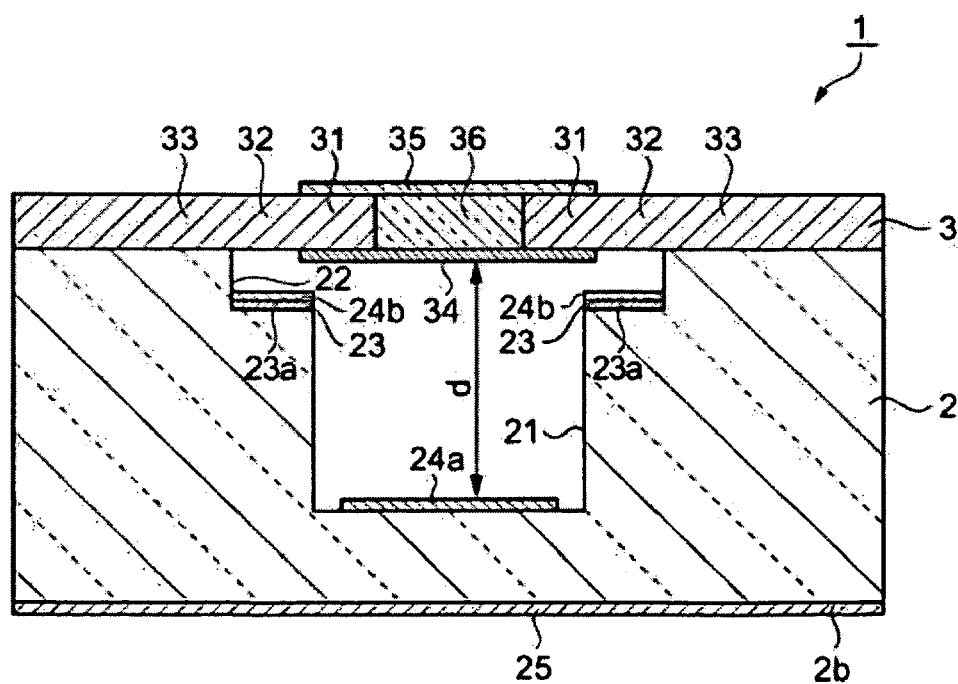
FIG. 3 is a cross-sectional view along the B—B line of FIG. 1.

As shown in FIGS. 1 through 3, the tunable filter 1 is equipped with a fixed substrate 2 and a movable substrate 3 bonded to the upper surface 2a of the fixed substrate 2.

The fixed substrate 2 is made of a material, having light transmittance property with respect to at least visible light, such as various kinds of glass. In the present embodiment, pyrex (registered trademark) glass #7740, sodium borosilicate glass produced by Corning Inc. is used therefor. The pyrex (registered trademark) glass, which contains sodium (Na) ions as mobile ions, is suitable for anodic bonding with the movable substrate 3 made of silicon, and further, since the #7740 has a thermal expansion coefficient substantially equal to that of silicon, no excessive stress caused by heat of the anodic bonding is applied thereto.

The thickness of the fixed substrate 2 is determined in accordance with the composing material or the usage, and is not particularly limited, but is set about 500 μm in the present embodiment.

On the upper surface (the surface facing the movable substrate 3) 2a of the fixed substrate 2, there are formed two cylindrical hollow sections 21, 22. In the present embodiment, the two hollow sections 21, 22 are formed in combination, wherein the first hollow section 21 is provided substantially the center of the bottom of the second hollow section 22. The depths of the first and the second hollows 21, 22 from the upper surface 2a of the fixed substrate 2 are selected in accordance with the usage, and are not particularly limited, but are set, in the present embodiment, to about 15 μm with respect to the first hollow section 21 and about 4 μm with respect to the second hollow section 22.

On both of the bottom surface of the second hollow section 22 and the upper surface 2a of the fixed substrate 2, there is formed a electrically conductive layer 23. The electrically conductive layer 23 is provided with a drive electrode 23a formed to have a ring like shape on the bottom surface of the second hollow section 22, two wiring patterns 23b extending on the upper surface 2a of the fixed substrate 2 in +X or −X direction respectively via the side surface of the second hollow section 22, and terminals 23c respectively formed on the edges of the wiring patterns and for applying voltage from the outside, wherein the drive electrode 23a, the two wiring patterns 23b, and the terminals 23c are formed as an unit.

The electrically conductive layer 23 has electrical conductivity, and is made of a transparent electrically conductive material such as ITO (Indium Tin Oxide) or the like, or of a metal such as Au or Cr or the like. The thickness of the electrically conductive layer 23 is properly selected in accordance with the composing material or the usage, and is not particularly limited, but can preferably be about 0.1 through 5 µm. On both of the upper surfaces of the drive electrode 23a and the wiring patterns 23b, there is provided a insulating film 24b for preventing short-circuit with the movable substrate 3.

On the bottom surface of the first hollow section 21, there is provided a fixed reflecting film (HR coat) 24a having an insulation property and for efficiently reflecting light, while on the lower surface 2b of the fixed substrate 2, there is provided a first antireflection film (AR coat) 25 for inhibiting reflection of the light. In the present embodiment, the fixed reflecting film 24a and the first antireflection film 25 are composed of multilayer films formed by stacking a $SiO_2$ film and/or a $Ta_2O_3$ film, and the insulating film 24b formed on the upper surfaces of the drive electrode 23a and the wiring patterns 23b has the same material configuration as the fixed reflecting film 24a.

The movable substrate 3 is made of silicon and has electrical conductivity. The movable substrate 3 is provided with a cylindrical movable section 31 disposed at substantially the center thereof, a support section for supporting the movable section 31 movably in the Z direction, and current supply section 33 for supplying current to the movable section 31, wherein the sections 31, 32, and 33 are formed as a unit.

The diameter of the movable section 31 is larger than the diameter of the first hollow section 21, and is smaller than the diameter of the second hollow section 22, and the thickness thereof is properly selected in accordance with the material or the usage, and is not particularly limited, but is set in the present embodiment to about 10 µm.

On substantially the entire lower surface (the surface facing the bottom surface of the first hollow section 21) of the movable section 31, there is provided a movable reflecting film (HR coat) 34 having an insulation property for efficiently reflecting the light, while on substantially the entire opposite surface (the upper surface of the movable section 31), there is provided a second antireflection film (AR coat) 35 for inhibiting reflection of the light. The movable reflecting film 34 and the second antireflection film 35 are formed of a multilayer film as is the case with the fixed reflecting film 24a and the first antireflection film 25.

Between the movable section 31 and the current supply section 33, there is formed a ring shaped opening section 32a, and the movable section 31 is supported to the current supply section 33 by the four supporting sections 32 traversing the opening section 32a. The supporting sections 32 are formed to be thin in width to have higher flexibility than the other sections. Note that, although in the present embodiment four of the supporting sections 32 are provided with 90° interval, the number of the supporting sections is not necessarily limited to four, but can be, for example, two, three, five or more.

Further, the current supply sections 33 are provided with opening sections 33a for exposing the terminals 23c on the fixed substrate 2, thus enabling to establish an electrical connection with the terminals 23c from the upper surface side.

In this case, at substantially the center of the movable section 31 and between the movable reflecting film 34 and the second antireflection film 35, there is formed a light transmitting section 36 of a cylindrical shape. The light transmitting section 36 is made of a material having a light transmitting property with respect at least to visible light, and in the case of the present embodiment, the same pyrex (registered trademark) glass as is used for the fixed substrate 2 is used therefor.

The movable substrate 3 configured as described above is bonded to the upper surface 2a of the fixed substrate 2 so that the periphery of the movable section 31 faces the drive electrode 23a. In this state, the fixed reflecting film 24a and the movable reflecting film 34 face each other with a predetermined gap (a first gap), and the drive electrode 23a and the movable section 31 are face each other with a predetermined gap (a second gap) including the insulating film 24b and the movable reflecting film 34 having an insulation property.

In the tunable filter 1 configured as described above, when voltage is applied between the terminal 23c on the fixed substrate 2 and the current supply section 33 of the movable substrate 3, potential difference appears between the drive electrode 23a and the movable section 31 to generate coulomb force for causing the both to pull each other. The movable section 31, which is supported by the supporting sections 32 having higher flexibilities, displaces in the −Z direction and stands still at a predetermined position corresponding to the applied voltage. In other words, the movable section 31 can be moved to predetermined positions in ±Z directions with respect to the fixed substrate 2 by altering the applied voltage, thus the distance d (the amount of the first gap) between the fixed reflecting film 24a and the movable reflecting film 34 can be adjusted (changed) to a desired distance. In this case, the drive electrode 23a functions as a drive section for displacing the movable section 31 with respect to the fixed substrate 2.

The action of the tunable filter of the present embodiment will now be described with reference to FIG. 2.

As shown in FIG. 2, the light entering from the upper surface side of the fixed substrate 2, for example, is transmitted through the second antireflection film 35, the light transmitting section 36, and the movable reflecting film 34, and enters the first gap defined between the movable reflecting film 34 and the fixed reflecting film 24a.

The light L input to the first gap is repeatedly reflected between the fixed reflecting film 24a and movable reflecting film 34 and also transmitted through the reflecting films 24a, 34 in accordance with the reflectance of each of the reflecting films 24a, 34. In this case, a lot of light waves having different numbers of reflection contained in the first gap interferes with each other, thus only light waves of the wavelength having substantially uniform phases are transmitted. Since the wavelength having the uniform phase depends on the length d of the first gap, the wavelength of the light to be transmitted can be selected by adjusting the length d. The light transmitted through the fixed reflecting film 24a is emitted to the outside through the fixed substrate 2 and the first antireflection film 25, and utilized for measuring intensity of the light having a specific wavelength, for example.

Note that, although in the present embodiment, the light is input from the upper surface side (the side of the second antireflection film 35), the light can also be input from the lower surface side (the side of the antireflection film 25). Further, the light outputting side is not limited to the opposite side to the light inputting side, but it can be arranged that the light output from the light inputting side is utilized.

A of manufacturing the tunable filter 1 of the present embodiment will now be described with reference to the accompanying drawings. FIGS. 4A through 4C, 5A through 5C, 6A through 6C, 7A, 7B, 8A through 8C, 9A through 9C, 10A through 10C, 11A through 11C are cross-sectional views showing a method of manufacturing the tunable filter 1 of the present embodiment, the cross-sectional views corresponding to the cross-sectional view along the A—A line in FIG. 1.

The manufacturing method includes [1] a process of manufacturing the fixed substrate, [2] a process of manufacturing the SOI substrate, [3] a process of bonding the fixed substrate with the SOI substrate, [4] a process of manufacturing the movable substrate. Hereinafter, each of the processes is sequentially described.

[1] Process of Manufacturing the Fixed Substrate

Figure 4A:
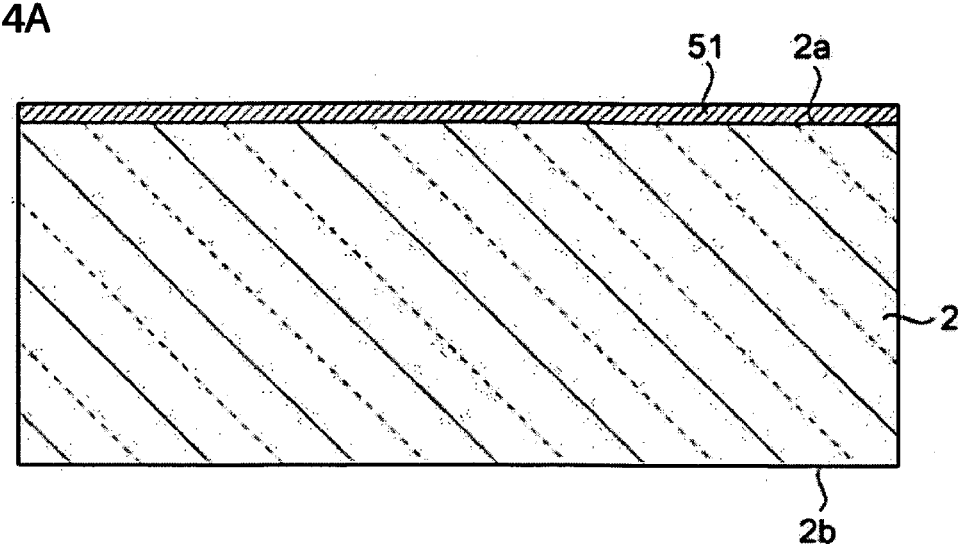
FIGS. 4A through 4C are cross-sectional views showing a method of manufacturing a tunable filter.

A shown in FIG. 4A, a mask layer 51 is deposited on the upper surface 2a of the fixed substrate 2. As a material for composing the mask layer 51, for example, a metal film made of Cr/Au or the like can be used. The thickness of the mask layer 51 is not particularly limited, but is preferably set to about 0.01 through 1 μm, further preferably about 0.09 through 0.11 μm. If the mask layer is too thin, the fixed substrate 2 may not sufficiently be protected, and if the mask layer is too thick, the mask layer may become easy to be peeled off due to the internal stress of the mask layer 51. In the present embodiment, a Cr/Au film is deposited as the mask layer 51 by a sputtering process with the Cr thickness of 0.03 μm and the Au thickness of 0.07 μm.

Figure 4B:
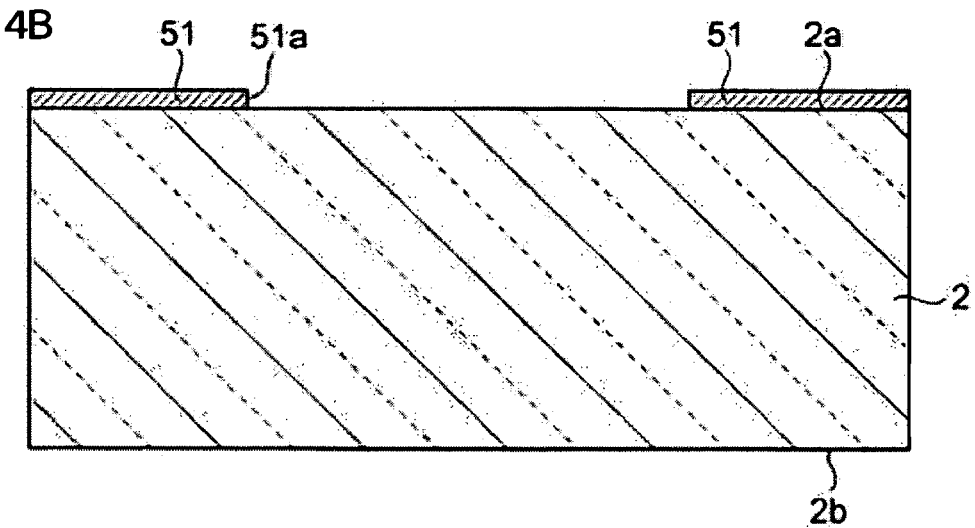

Subsequently, as shown in FIG. 4B, an opening section 51a for forming the second hollow section 22 is provided to the mask layer 51. The opening section 51a can be formed by, for example, a photolithography process. Specifically, a resist layer (not shown) having a corresponding pattern to the opening section 51a is formed on the mask layer 51, and then a part of the mask layer 51 is removed using the resist layer as a mask, and after then the resist layer is removed to form the opening section 51a is formed. Note that the part of the mask layer 51 is removed by a wet-etching process or the like.

Figure 4C:
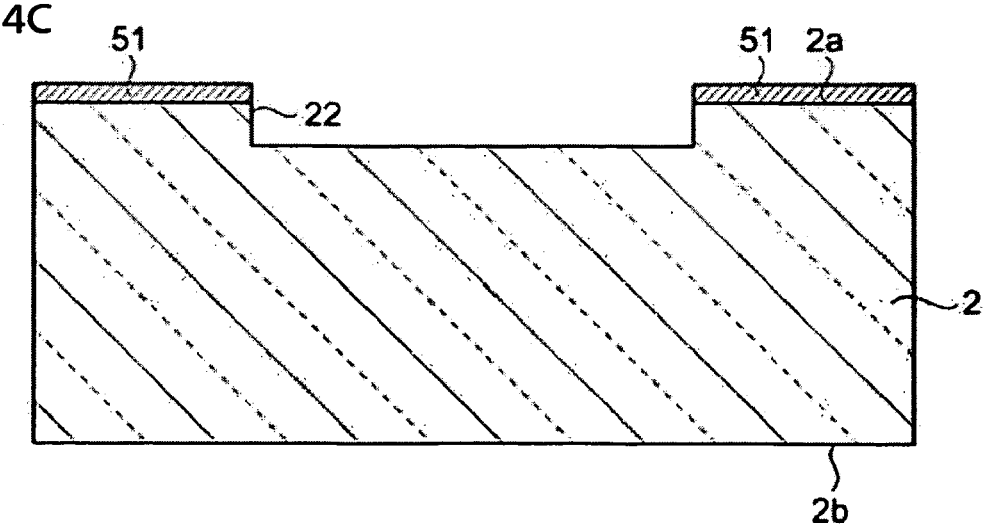

Subsequently, as shown in FIG. 4C, the fixed substrate 2 is etched by a wet-etching process to form the second hollow section 22. As an etching fluid, water solution of fluorinated acid, for example, can be used. Note that, the method of forming the second hollow section 22 is not limited to the wet-etching process, but other etching processes such as a dry-etching process can also be used therefor.

Figure 5A:
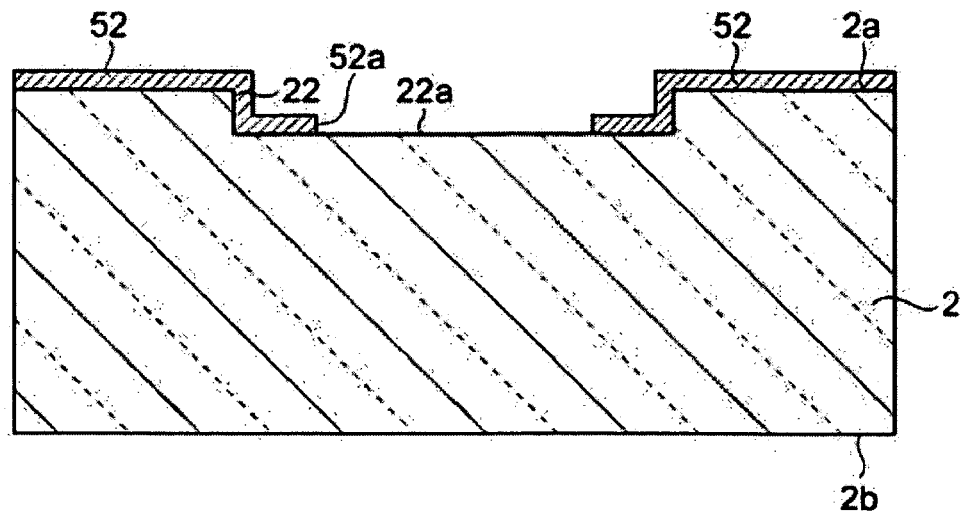
FIGS. 5A through 5C are cross-sectional views showing a method of manufacturing a tunable filter.
Figure 5B:
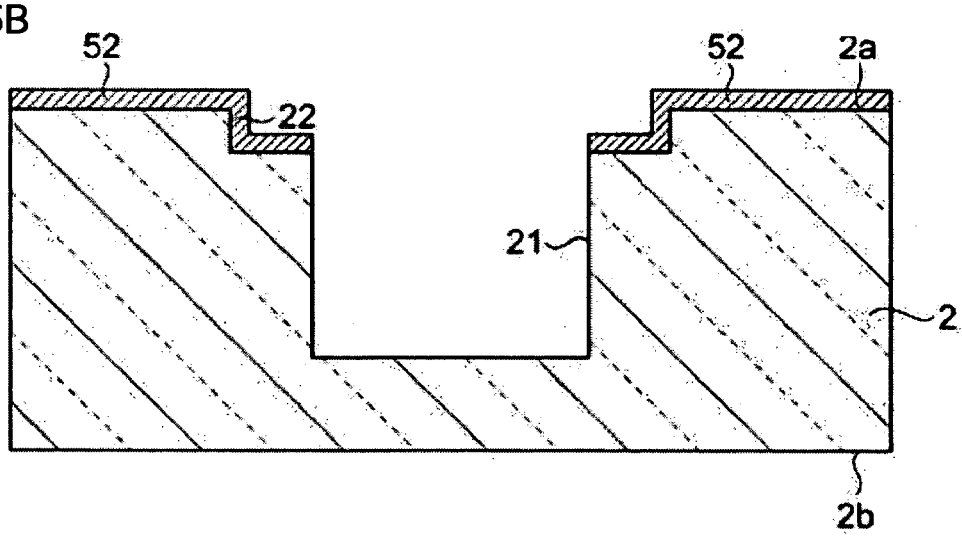
Figure 5C:
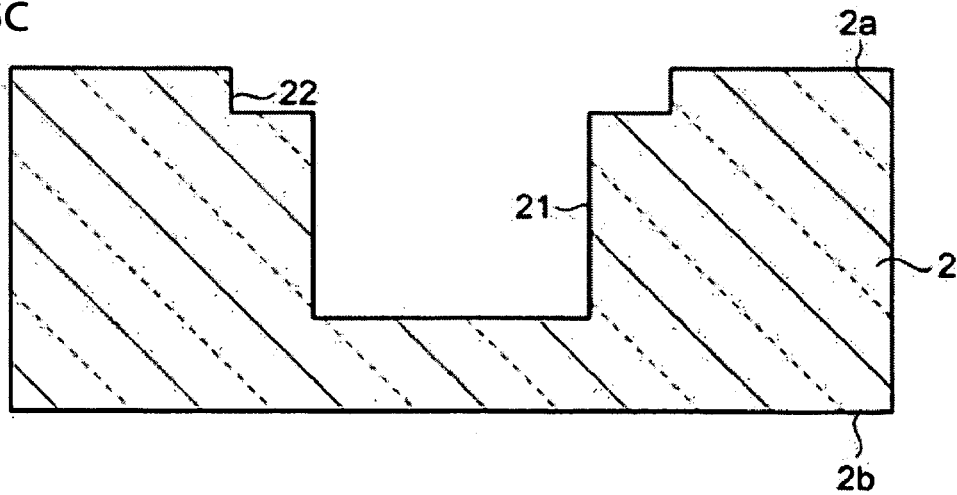

Subsequently, after removing the mask layer 51 by the etching process, the first hollow section 21 is then formed in the same manner as the formation of the second hollow section 22. Specifically, a mask layer 52 is deposited on the fixed substrate 2, as shown in FIG. 5A, to form an opening section 52a for forming the first hollow section 21. Subsequently, as shown in FIG. 5B, the bottom surface 22a of the second hollow section 22 is etched by the wet-etching process to form the first hollow section 21. After then, as shown in FIG. 5C, by removing the mask layer 52 by the etching process, the fixed substrate 2 equipped with the first and the second hollow sections can be obtained.

Figure 6A:
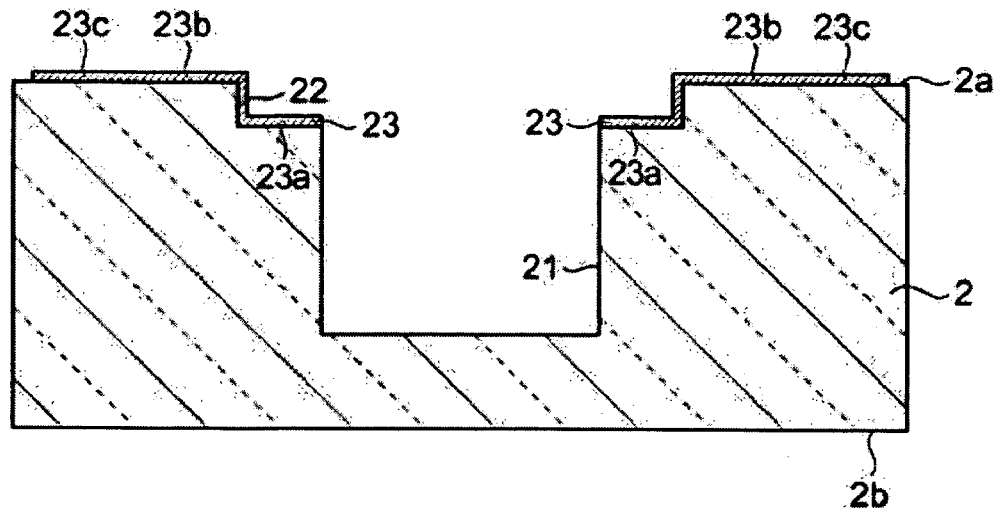
FIGS. 6A through 6C are cross-sectional views showing a method of manufacturing a tunable filter.

Subsequently, as shown in FIG. 6A, the electrically conductive layer 23 composed of the drive electrode 23a, the wiring patterns 23b, and the terminals 23c is formed. As a material for forming the electrically conductive layer 23, a metal film made of, for example, Cr, Al, or a transparent conductive material such as ITO can be used. The thickness of the electrically conductive layer 23 is preferably set to, for example, 0.1 through 0.2 μm.

In order for forming the electrically conductive layer 23, the metal film or the like is deposited by a vapor deposition process, a sputtering process, an ion-plating process or the like, and then the film is patterned by a photolithography process and an etching process.

Figure 6B:
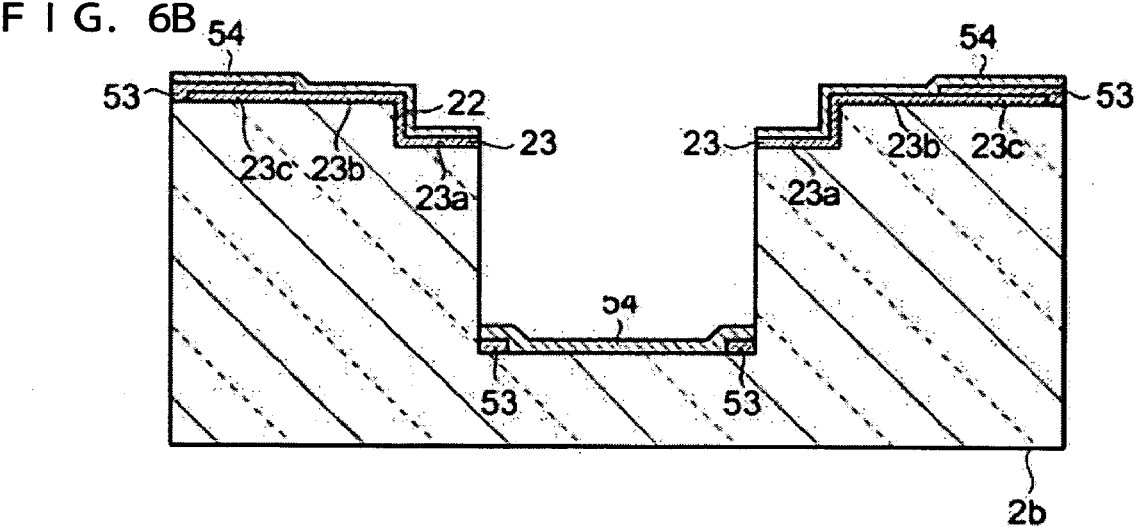

Subsequently, the fixed reflecting film 24a and the insulating film 24b are respectively formed on the bottom surface of the first hollow section 21, and the front surfaces of the drive electrode 23a and the wiring patterns 23b. In the present embodiment, the fixed reflecting film 24a and the insulating film 24b have the common material composition, and therefore, are made at the same time. Specifically, as shown in FIG. 6B, a resist 53 is deposited on the upper surface 2a of the fixed substrate 2, and then patterned by a photolithography process and an etching process. And after removing the resist 53 from a part where the fixed reflecting film 24a or the insulating film 24b is formed, a $SiO_2$ film or a $Ta_2O_5$ film or the like are alternately deposited by a vapor deposition process or the like to form a multilayer film 54.

Figure 6C:
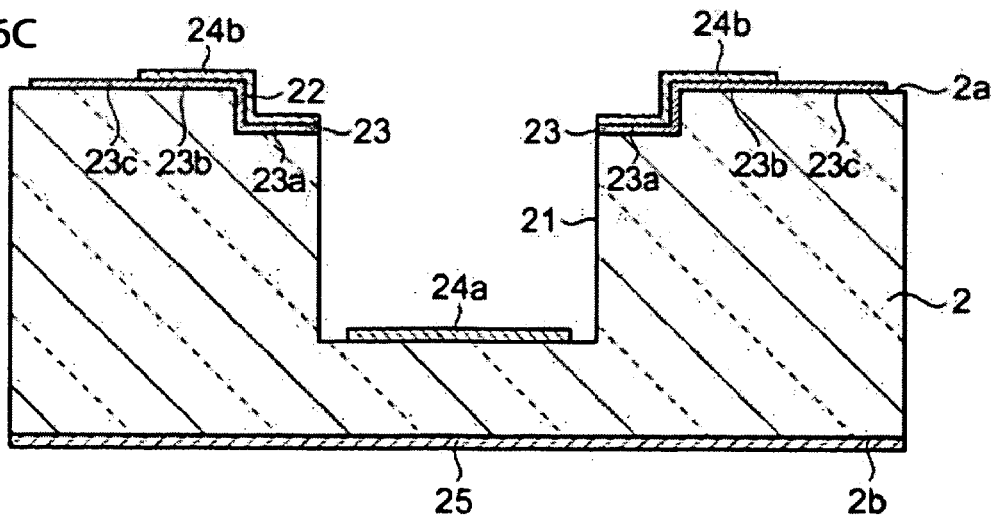

Subsequently, by removing the multilayer film 54 deposited on the resist 53 together with the resist 53 using a liftoff process, as shown in FIG. 6C, the fixed reflecting film 24a and the insulating film 24b are respectively formed on the bottom surface of the first hollow section 21, and the front surfaces of the drive electrode 23a and the wiring patterns 23b. After then, the first antireflection film 25 formed of the similar multilayer film is formed on the lower surface of the fixed substrate 2. In this case, whether the fixed reflecting film 24a and the first antireflection film 25 become the reflecting films or the antireflection films, or the reflectance ratios and the wavelength band to be transmitted can be selected by arranging the thickness of each of the layers, the number of layers, the materials therefor, and so on. Further, the thickness of the fixed reflecting film 24a is preferably set to, for example, 0.1 through 12 μm.

[2] Process of Manufacturing the SOI Substrate

In the present embodiment, the SOI substrate is used as the base for forming the movable substrate 3 made of silicon.

As shown in FIG. 7A, the SOI substrate 60 is formed as a laminated body of three layers, a first Si layer (base layer) 61, a $SiO_2$ layer (insulating layer) 62 which is an embedded oxidized film, and a second Si layer (active layer) 63. The thickness of the SOI substrate 60 is not particularly limited, but in the present embodiment, the SOI substrate having the first Si layer 61 of about 500 μm thick, the $SiO_2$ layer 62 of about 4 μm thick, and the second Si layer 63 of about 10 μm thick.

Firstly, as shown in FIG. 7B, an opening section 36a for forming the light transmitting section 36 is provided to the second Si layer 63 by a photolithography process and an etching process.

Figure 8A:
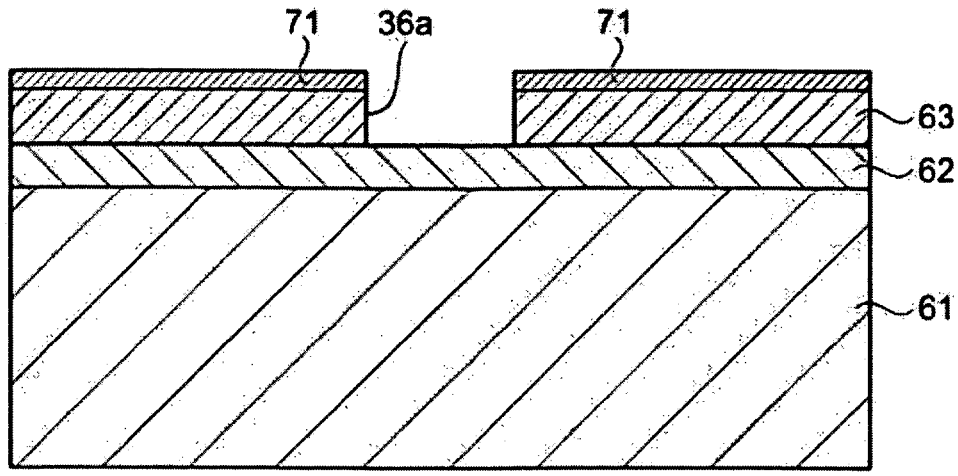
FIGS. 8A through 8C are cross-sectional views showing a method of manufacturing a tunable filter.
Figure 8B:
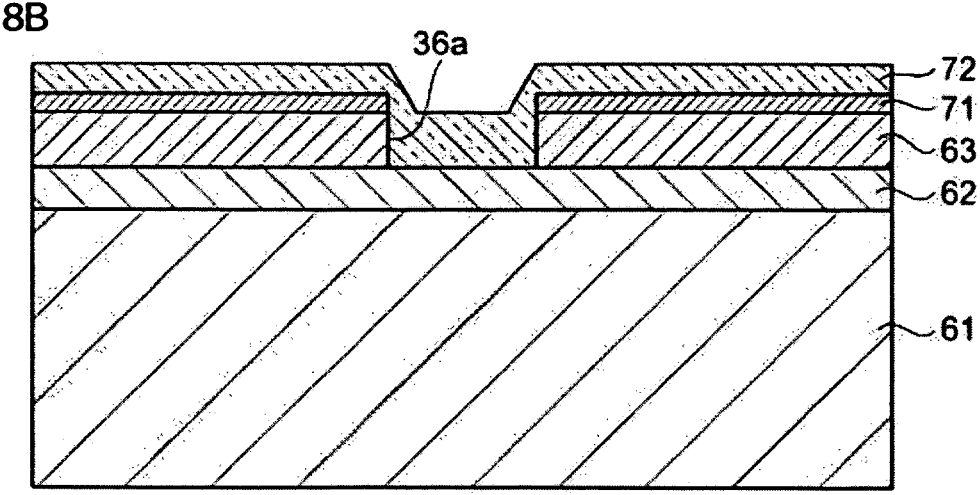
Figure 8C:
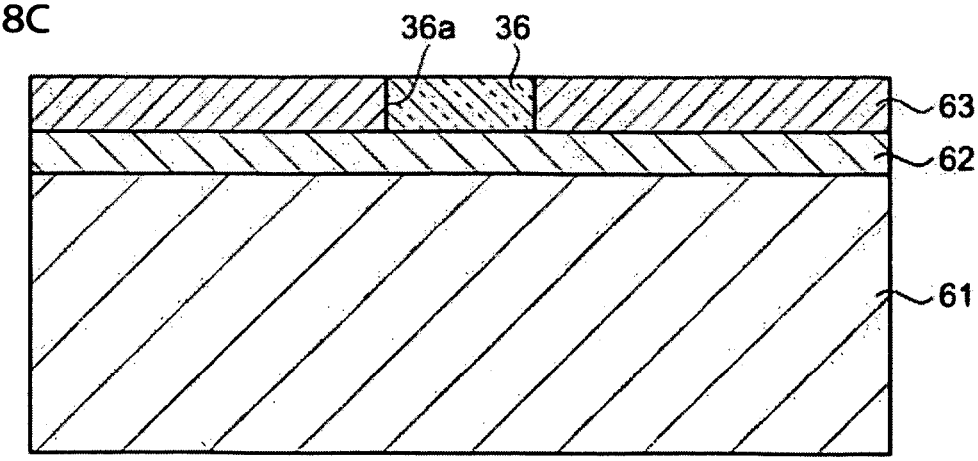

Subsequently, as shown in FIG. 8A, a resist 71 is formed on the second Si layer 63. Specifically, after depositing the resist 71 on the second Si layer 63 and on a part of the $SiO_2$ layer 62 exposed through the opening section 36a, patterning is executed by a photolithography process and an etching process or the like to remove the resist on the $SiO_2$ layer 62. Subsequently, as shown in FIG. 8B, a glass layer 72 made of pyrex (registered trademark) glass is deposited inside the opening section 36a and on the resist 71 by a sputtering process. After then, by removing the glass layer 72 deposited on the resist 71 together with the resist 71 by a liftoff process, as shown in FIG. 8C, the light transmitting section 36 made of the pyrex (registered trademark) glass is formed inside the opening section 36a.

Figure 9A:
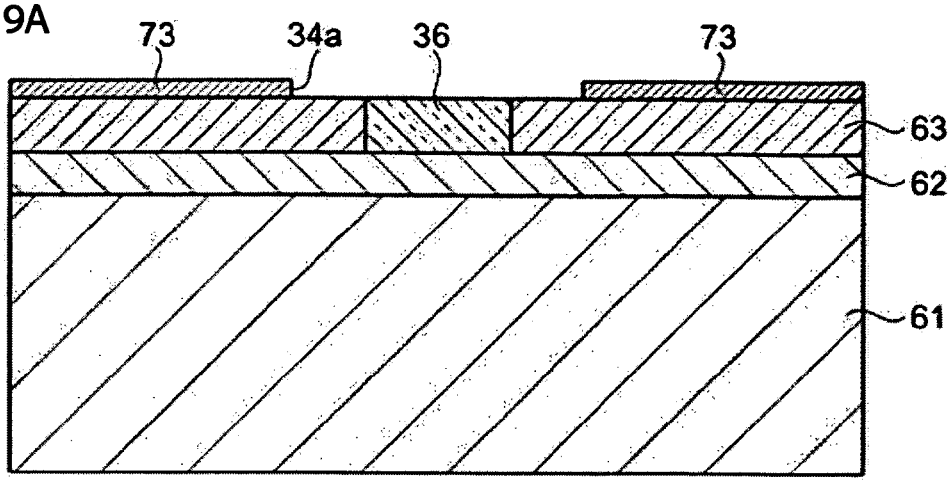
FIGS. 9A through 9C are cross-sectional views showing a method of manufacturing a tunable filter.
Figure 9B:
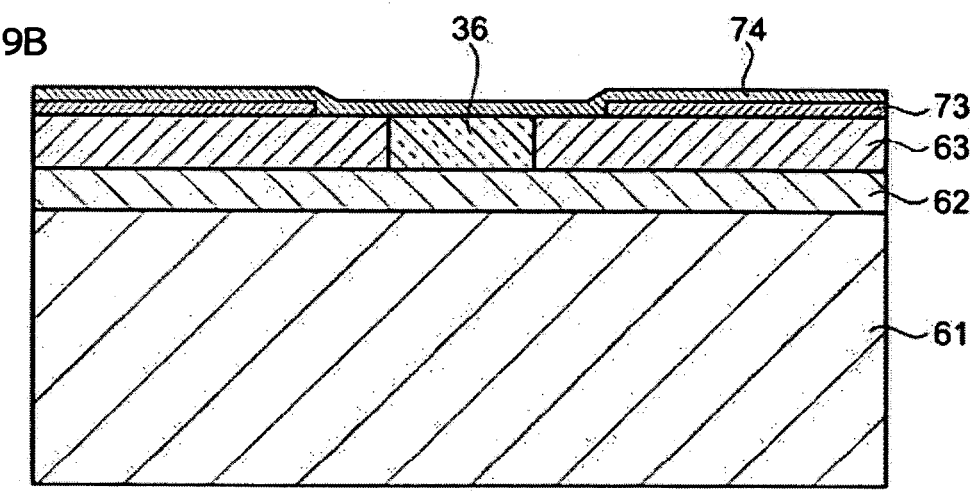
Figure 9C:
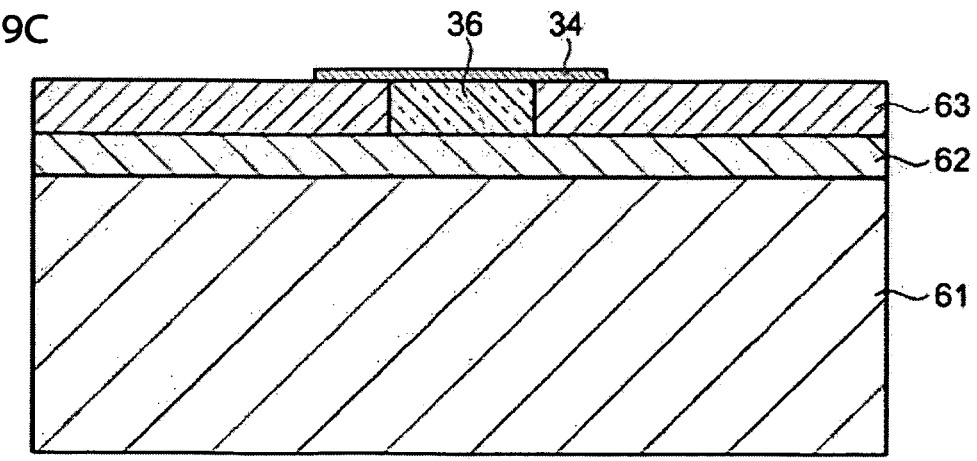

Subsequently, as shown in FIG. 9A, a resist 73 is deposited on the second Si layer 63, and then patterned by a photolithography process and an etching process to form an opening section 34a for forming the movable reflecting film 34. Subsequently, as shown in FIG. 9B, a multilayer film 74 having the similar composition to the fixed reflecting film 24a is deposited inside the opening section 34a and on the resist 73. After then by removing the multilayer film 74 deposited on the resist 73 together with the resist 73 by a liftoff process, as shown in FIG. 9C, the movable reflecting film 34 is formed.

[3] Process of Bonding the Fixed Substrate With the SOI Substrate

Figure 10A:
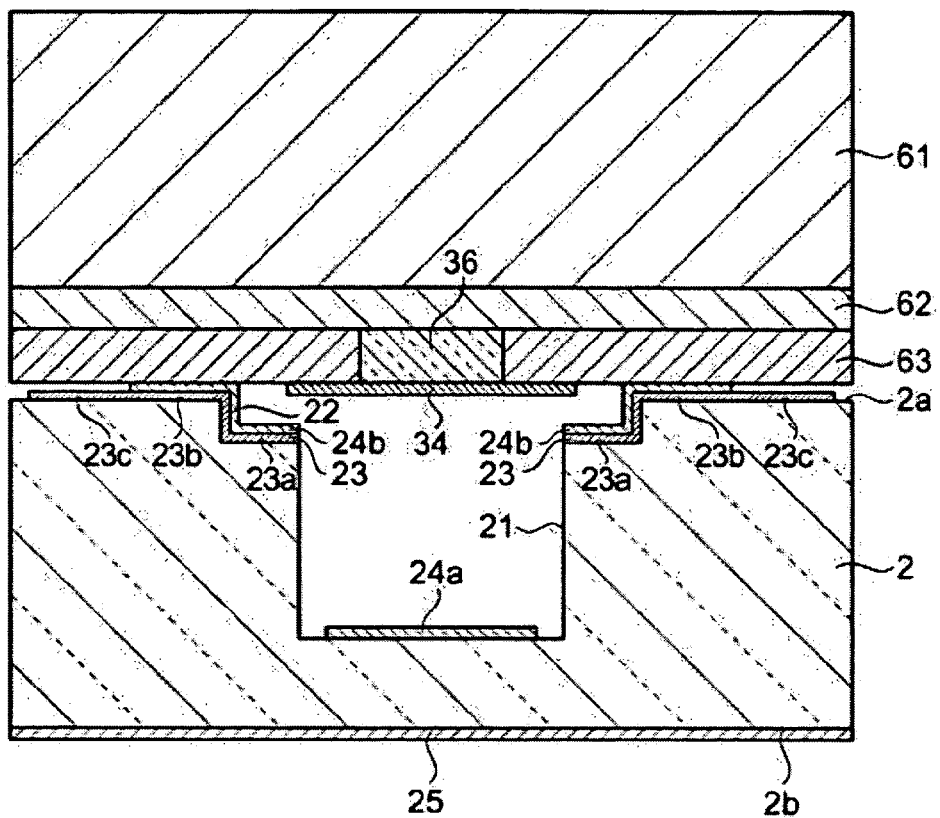
FIGS. 10A and 10B are cross-sectional views showing a method of manufacturing a tunable filter.

As shown in FIG. 10A, while facing the surface (the upper surface 2a) of the fixed substrate 2 provided with the first and the second hollow sections 21, 22 formed thereon and the second Si layer 63 of the SOI substrate 60 each other, the fixed substrate 2 and the SOI substrate 60 are bonded each other by an anodic bonding process or the like.

When bonded by an anodic bonding process, for example, the fixed substrate 2 is connected to the negative terminal of a direct current power source not shown in the drawings, and the second Si layer 63 is connected to the direct current power source, respectively. After then, if the fixed substrate 2 is applied with a voltage while heated, the heating helps Na ions in the fixed substrate 2 move. By the movement of the Na ions, the bonding surface of the fixed substrate 2 is charged negatively, and the bonding surface of the second Si layer 63 is charged positively. As a result, the fixed substrate 2 and the SOI substrate 60 are firmly bonded with each other.

Note that, since the wiring patterns 23b and the insulating film 24b are formed on the upper surface 2a of the fixed substrate 2, a gap is formed between the SOI substrate 60 and the fixed substrate 2 in the area actually anodic-bonded. If the wiring pattern 23b and the insulating film 24b are thin enough, however, flexibility of the SOI substrate 60 or the fixed substrate 2 makes the bonding possible. If the wiring patters 23b and the insulating film 24b are rather thick, the upper surface 2a of the fixed substrate 2 can be provided with grooves in the areas where the wiring patters 23b or the insulating film 24b are to be formed, thus preventing the wiring patterns 23b and the insulating film 24b from protruding from the upper surface 2a.

[4] Process of Manufacturing the Movable Substrate

Subsequently, the first Si layer 61 is removed. As the removing process, a wet-etching process, a dry-etching process, or a polishing process is used. However, since the SiO$_2$ layer 62 functions as the stopper layer in either case, any damages to the second Si layer 63 can be prevented.

If the wet-etching process is executed, water solution of KOH, for example, can be used as the etching fluid. The concentration of the KOH water solution is preferably 1 through 40% by weight, and more preferably 2 through 20% by weight. The reaction formula of the etching process is as follows.

$$Si+2KOH+H_2O \rightarrow K_2SiO_3+2H_2$$

In this case, since the etching rate of Si by the KOH water solution is considerably higher than the etching rate of the SiO$_2$, the SiO$_2$ layer 62 can function as the stopper layer. Note that, as an alternative etching fluid, a TMAH (tetramethyl ammonium hydroxide) water solution, an EPD (ethylenediamine-pyrocatechol-diazine) water solution, or a hydrazine water solution can be used. Since the wet-etching process can be executed as a batch, the productivity can be enhanced.

Incidentally, if the dry-etching process is executed, XeF2, for example, is used as the etching gas under 390 MPa of pressure in about 60 seconds. The reaction formula of the etching process is as follows.

$$2XeF_2+Si \rightarrow 2Xe+SiF_4$$

Note that, since the etching rate of Si by the KOH water solution is considerably higher than the etching rate of the SiO$_2$ in also the case of dry-etching process using XeF$_2$, the SiO$_2$ layer 62 can function as the stopper layer. Note also that, since the etching process does not use plasma, damages to other sections can be prevented. The plasma etching process using CF$_4$ or SF$_6$ instead of XeF2 can be executed.

Figure 10B:
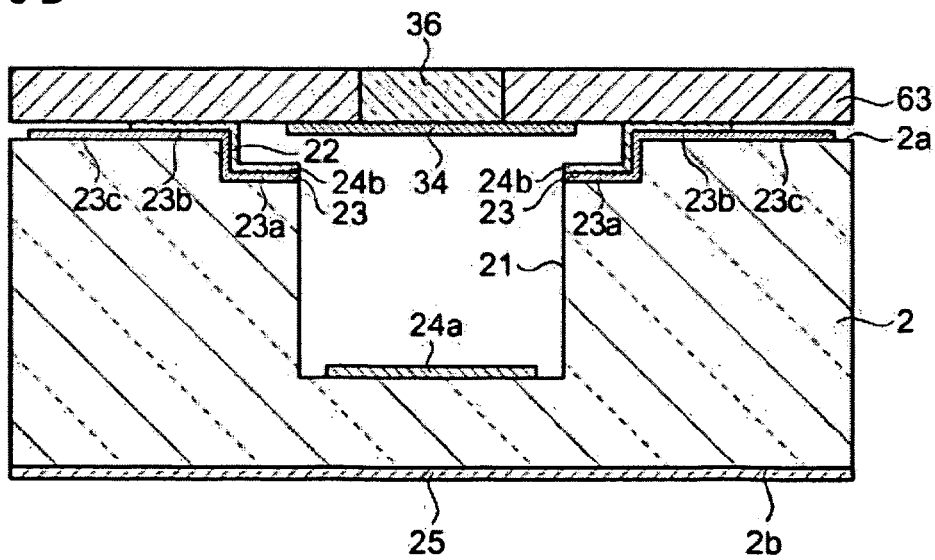

After the SiO$_2$ layer 62 is subsequently removed by, for example, a wet-etching process using a fluorinated acid water solution or the like, as shown in FIG. 10B, the light transmitting section 36 formed on the second Si layer 63 is exposed in the upper surface thereof.

Figure 11A:
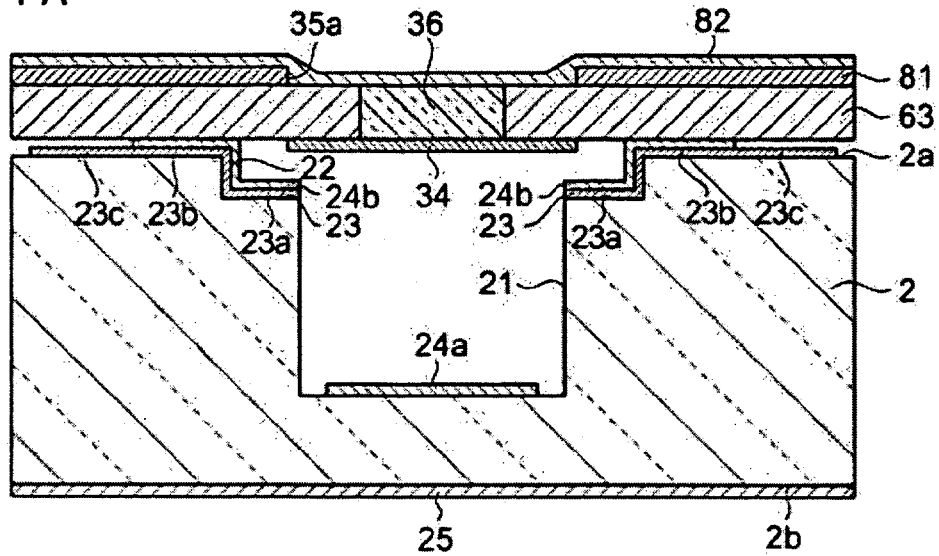
FIGS. 11A through 11C are cross-sectional views showing a method of manufacturing a tunable filter.
Figure 11B:
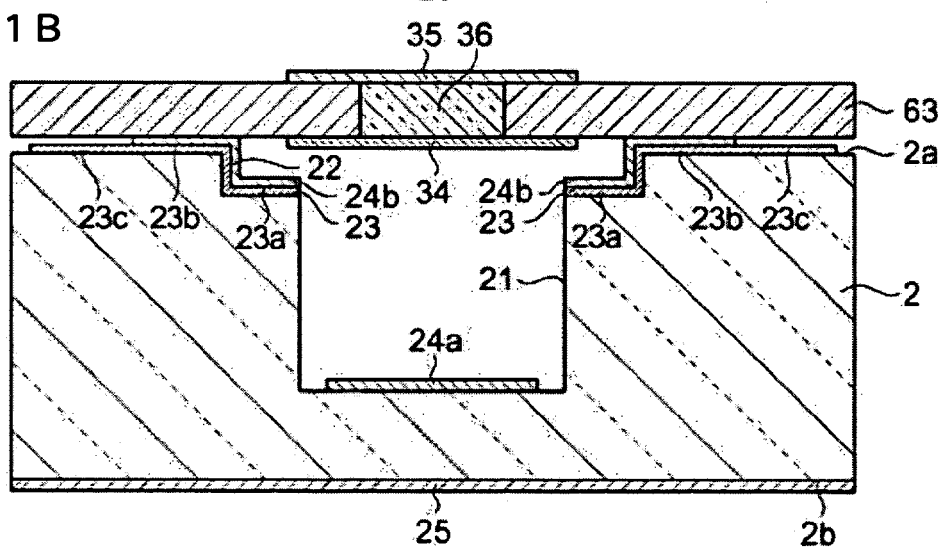

Subsequently, as shown in FIG. 11A, a resist 81 is deposited on the second Si layer 63, and then patterned by a photolithography process and an etching process and so on to form an opening section 35a for forming the second antireflection film 35 on the light transmitting section 36. Subsequently, a multilayer film 82 having a similar configuration to the first antireflection film 25 is deposited inside the opening section 35a and on the resist 81. After then by removing the multilayer film 82 deposited on the resist 81 together with the resist 81 by a liftoff process, as shown in FIG. 11B, the second antireflection film 35 is formed.

Figure 11C:
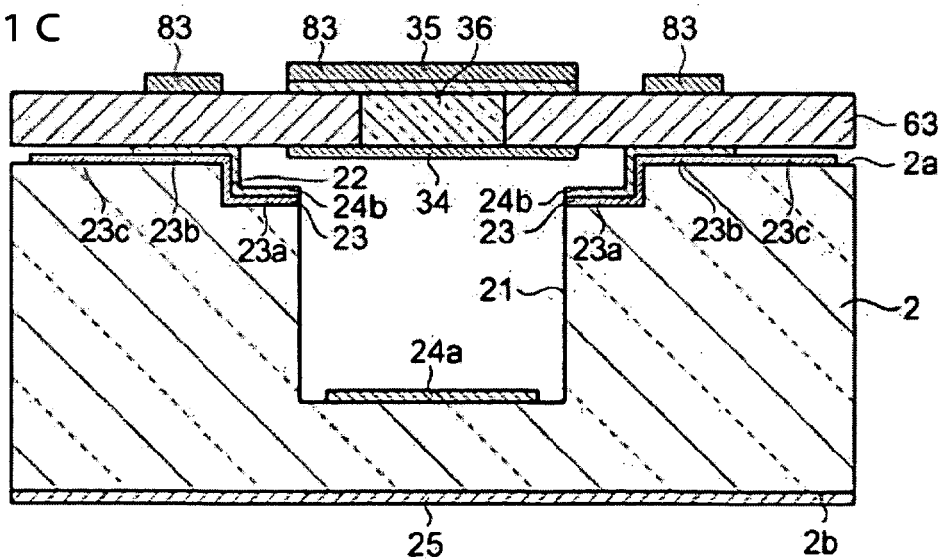

Subsequently, as shown in FIG. 11C, a resist 83 is deposited on the second Si layer 63, and then patterned by a photolithography process and an etching process and so on in accordance with the shapes of the movable section 31, supporting section 32, and the current supply section 33. After then, opening sections 32a, 33a are formed by etching the second Si layer 63 by an anisotropic etching process, and further, the resist 83 is removed by, for example, an ashing process with oxygen plasma to form the movable substrate 3 on the fixed substrate 2 as shown in FIG. 2.

As explained above, according to the tunable filter 1 and the method of manufacturing the tunable filter of the present embodiment, the following advantages can be obtained.

(1) According to the tunable filter 1 of the present embodiment, since the tunable filter 1 is provided with the light transmitting section 36 capable of transmitting light having a shorter wavelength than infrared light, the light having the shorter wavelength than infrared light can be wavelength-separated.

(2) According to the tunable filter 1 of the present embodiment, since the insulating films (the movable reflecting film 34 and the insulating film 24b, respectively) are provided to an area of the movable section 31 facing the drive electrode 23a and an area of the drive electrode 23a facing the movable section 31, the movable section 31 and the drive electrode 23a can be prevented from sticking to each other.

(3) According to the tunable filter of the present embodiment, since the first and the second antireflection films 25, 35 are provided to the surface of the fixed substrate 2 opposite to its surface provided with the fixed reflecting film 24a and the surface of the light transmitting section 36 opposite to its surface provided with the movable reflecting film 34, respectively, reflection of the incident light can be prevented, thus efficiently taking the light from the outside.

(4) According to the tunable filter 1 of the present embodiment, since the fixed substrate 2 is made of glass containing Na ions as mobile ions, the foxed substrate 2 and the SOI substrate 60 (the movable substrate 3) can be bonded by an anodic bonding process. Namely, since bonding can be performed without any other materials such as adhesives, the precision of the first gap is improved to enable to accurately set the wavelength of separation.

(5) According to the tunable filter 1 of the present embodiment, since a glass material capable of transmitting the light having a shorter wavelength than infrared light is used for the light transmitting section 36, the light transmitting section 36 can easily be formed by a sputtering process.

(6) According to the tunable filter 1 of the present embodiment, since the movable substrate 3 is made of silicon, the movable substrate 3 can easily manufactured by a manufacturing process for semiconductors.

(7) According to the method of manufacturing the tunable filter 1 of the present embodiment, the movable substrate 3 is formed on the fixed substrate 2 after the first and the second hollow sections 21, 22 are provided to the fixed substrate 2 and then the fixed reflecting film 24a and the drive electrode 23a are formed on the respective bottom surfaces thereof. Therefore, the process of removing the sacrifice layer to form the first and the second gaps is not required. Further, since the release hole does not need to be provided in accordance therewith, the coulomb force can effectively be utilized.

(8) According to the method of manufacturing the tunable filter 1 of the present embodiment, since the fixed substrate 2 and the SOI substrate 60 for forming the movable substrate 3 are separately processed, the insulating film 24b for preventing sticking of the both can easily be formed between the movable section 31 and drive electrode 23a.

(9) According to the method of manufacturing the tunable filter 1 of the present embodiment, since the fixed substrate 2 is made of glass, and the first hollow section 21 is formed by the etching process of the glass offering high precision of formation, the first gap can precisely be formed. As a result, the wavelength for separation can accurately be set.

(10) According to the method of manufacturing the tunable filter 1 of the present embodiment, since the fixed substrate 2 is made of glass, and the second hollow section 22 is formed by the etching process of the glass offering high precision of formation, the second gap can precisely be formed. As a result, the coulomb force can be controlled with high accuracy.

(11) According to the method of manufacturing the tunable filter 1 of the present embodiment, since the $SiO_2$ layer 62 is used as the stopper layer for removing the first Si layer 61, damages to the Si layer 63 which is to form the movable substrate 3 can be prevented. As a result, since the thickness precision of the movable substrate 3, namely the movable section 31, is improved, the movable section 31 can stably be driven, thus the variable amount of the first gap can accurately be controlled, and further, the manufacturing process yield can be enhanced.

Embodiment 2

The second embodiment of the invention will now be described with reference to the accompanying drawings. FIG. 12 is a configuration diagram of a sensing device equipped with the tunable filter 1 of the first embodiment.

As shown in FIG. 12, the sensing device 100 is equipped with a light inputting section 101, the tunable filter 1, and a sensing section 102. The light L input from the light inputting section 101 is wavelength-separated by the tunable filter 1, and only the light having a predetermined wavelength enters the sensing section 102.

According to the sensing device 100 of the present embodiment, since the tunable filter 1 is equipped with the light transmitting section 36 (See FIG. 2.) capable of transmitting the light having the shorter wavelength than infrared light, the sensing object for the sensing device 100 is not limited to infrared light.

Modified Embodiment

Note that the embodiments of the invention can be modified as follows.

In the tunable filter 1 of the embodiment, although the light transmitting section 36 is formed to have substantially the same thickness as the movable substrate 3 (See FIG. 2.), the thickness of the light transmitting section 36 is not limited thereto, but can be thicker or thinner than the movable substrate 3.

In the tunable filter 1 of the embodiment, although the fixed reflecting film 24a, the movable reflecting film 34, and the first and the second antireflection films 25, 35 are formed of the multilayer films, they can also be formed of single layer films.

In the tunable filter 1 of the embodiment, although the drive section for driving the movable section 31 is configured so as to utilize the coulomb force, it can also be configured so as to utilize electromagnet force or a piezoelectric effect.

In the method of manufacturing the tunable filter 1 of the embodiment, although the fixed reflecting film 24a, the movable reflecting film 34, and the second antireflection film 35 are formed by the liftoff processes, they can also be formed by, for example, an etching process using a hard mask.

In the method of manufacturing the tunable filter 1 of the embodiment, although the insulating film 24b covering the drive electrode 23a and the wiring patterns 23b is arranged to have the same material composition as the fixed reflecting film 24a and is formed simultaneously, it can separately be formed using a different material from the fixed reflecting film 24a. For example, a $SiO_2$ layer can be provided on the drive electrode 23a and the wiring patterns 23b. Further, the insulating film 24b can be provided to the movable substrate 3. For example, the $SiO_2$ layer can be provided by a thermal oxidization process or a TEOS (tetraethoxisilane)-CVD (Chemical Vapor Deposition) to the surface of the movable substrate 3 with which the fixed substrate 2 is bonded.

In the method of manufacturing the tunable filter 1 of the embodiment, although the SOI substrate is used as the base material for forming the movable substrate 3, a single silicon substrate, a SOS (Silicon On Sapphire) substrate, or a substrate composed of two silicon substrates, each provided with a $SiO_2$ layer on the surface thereof, bonded so as to face the $SiO_2$ layers each other, for example, can be used.

In the method of manufacturing the tunable filter 1 of the embodiment, although the anodic bonding process is used as the bonding method of the SOI substrate 60 with the fixed substrate 2, the bonding process is not limited thereto, but they can be bonded by, for example, an adhesive or a low-melting glass.

In the tunable filter 1 of the embodiment, although the light transmitting section 36 is composed of the pyrex (registered trademark) glass, the composition of the light transmitting section 36 is not limited thereto, but, PDMS (poly-dimethyl siloxane) or the like, or silicone rubber capable of transmitting the light having a shorter wavelength than infrared light, for example, can be used therefor.

According to this, for example, the light transmitting section 36 can be formed by running the silicone rubber in the opening section 36*a* (See FIG. 7B.) and then heating to cure it, thus the light transmitting section 36 can easily be formed.

The usage of the tunable filter 1 of the embodiment is not limited. It can be used for, for example, checking a UV absorption spectrum or an image writing device. In this case, by providing a channel (groove) in which an object (fluid) to be measured flows to the upper surface or the lower surface of the tunable filter 1, the device can be miniaturized.

Further, the tunable filter 1 can be equipped additionally with a light receiving element for receiving the light output from the tunable filter 1 or with a microcomputer for analyzing the output light. Still further, if a detector for measuring the lengths of the first and the second gaps, setting of the wavelength for separation or driving by the coulomb force can be performed with good accuracy by feeding the measurement results back to the microcomputer.

What is claimed is:

1. A tunable filter comprising:
   a fixed substrate provided with a first hollow section and a second hollow section formed in one surface thereof, and capable of transmitting light having a shorter wavelength than infrared light;
   a movable substrate having a electrically conductive property and provided with a movable section and disposed to the fixed substrate so that the movable section faces bottom surfaces of the first and the second hollow sections;
   a movable reflecting film provided to a surface of the movable section, the surface facing the bottom surfaces of the first and the second hollow sections;
   a fixed reflecting film provided to the bottom surface of the first hollow section defining a first gap with the movable reflecting film; and
   a drive electrode provided to the bottom surface of the second hollow section defining a second gap with the movable section and for displacing the movable section with respect to the fixed substrate, by coulomb force generated by a potential difference from the movable section, to vary the length of the first gap,
   wherein light entering the first gap from the outside is repeatedly reflected by the movable reflecting film and the fixed reflecting film for outputting light having a wavelength corresponding to the length of the first gap, and
   the movable section is provided, at an area to which the movable reflecting film is disposed, with a light transmitting section capable of transmitting light having a shorter wavelength than infrared light and for inputting/outputting light from/to the outside, the light transmitting section having a substantially cylindrical shape.

2. The tunable filter according to claim 1, wherein an insulating film is provided to at least one of an area of the movable section facing the drive electrode and an area of the drive electrode facing the movable section.

* * * * *